F. A. WOEHR.
STRIP UNITING MACHINE.
APPLICATION FILED FEB. 4, 1921.
1,417,651.
Patented May 30, 1922.
8 SHEETS—SHEET 3.
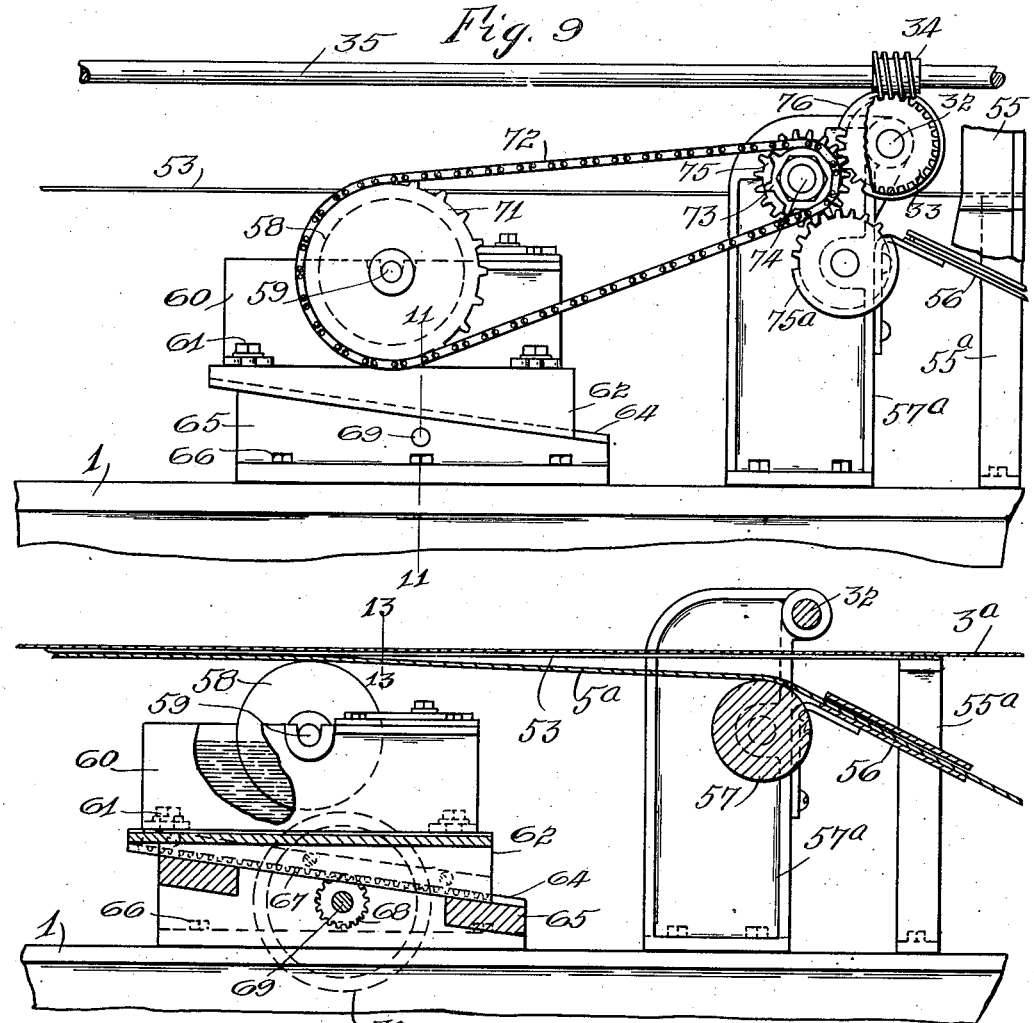
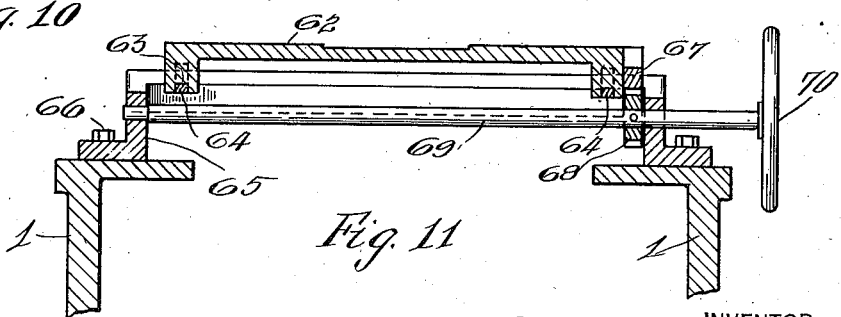
INVENTOR
Frederick A. Woehr
BY
Davis
ATTORNEYS

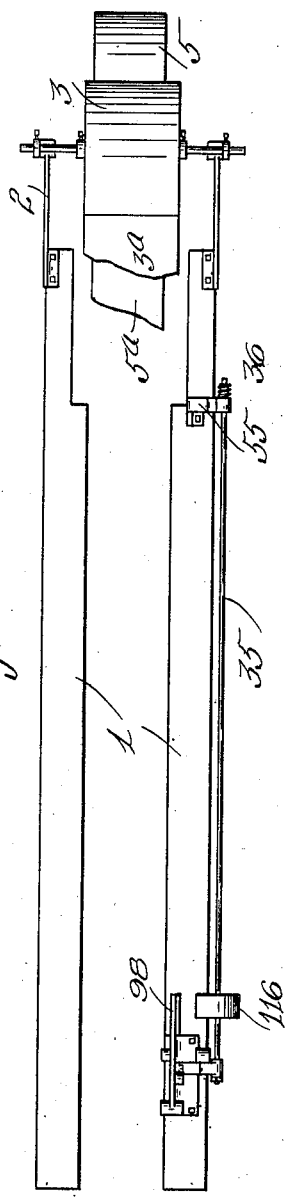

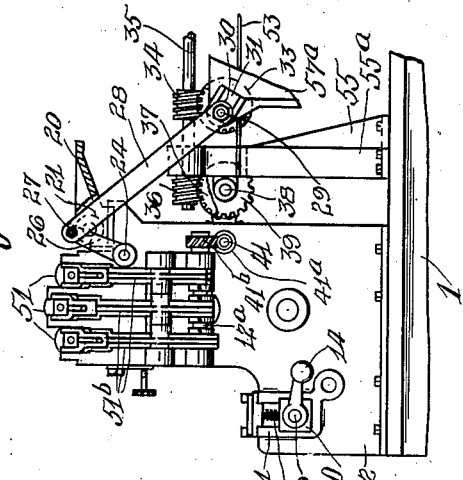

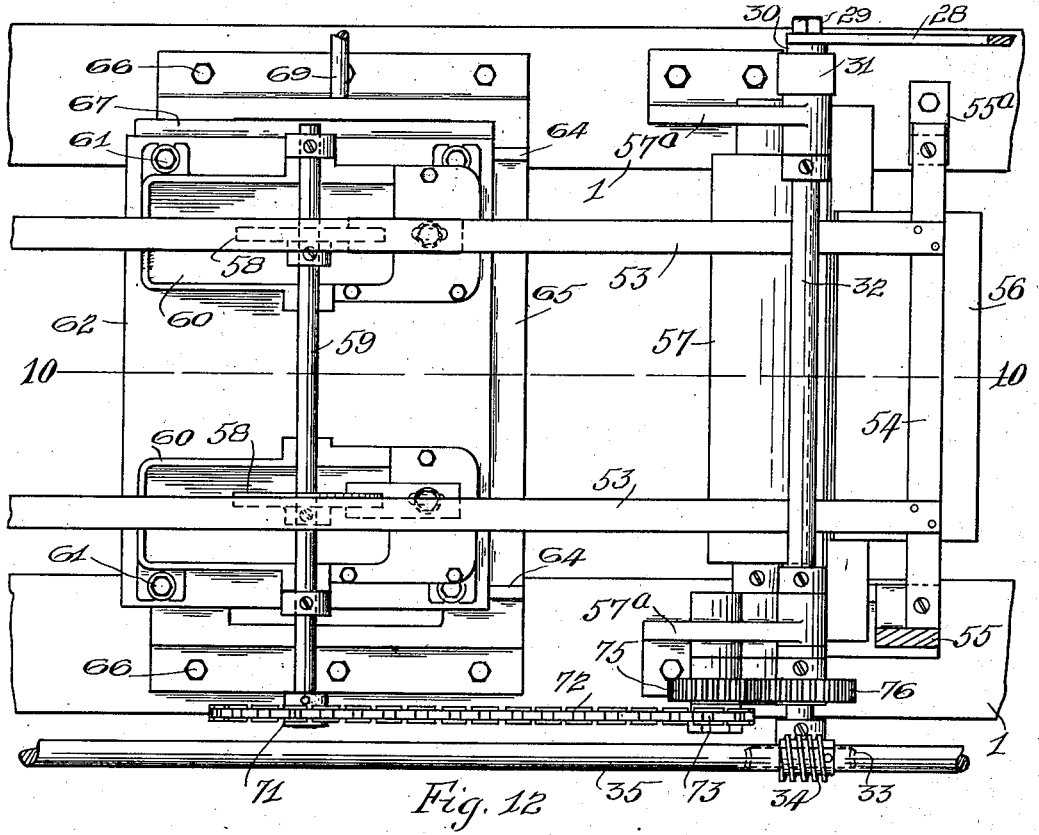
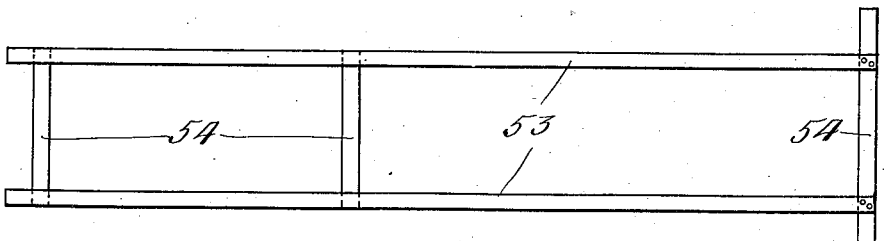

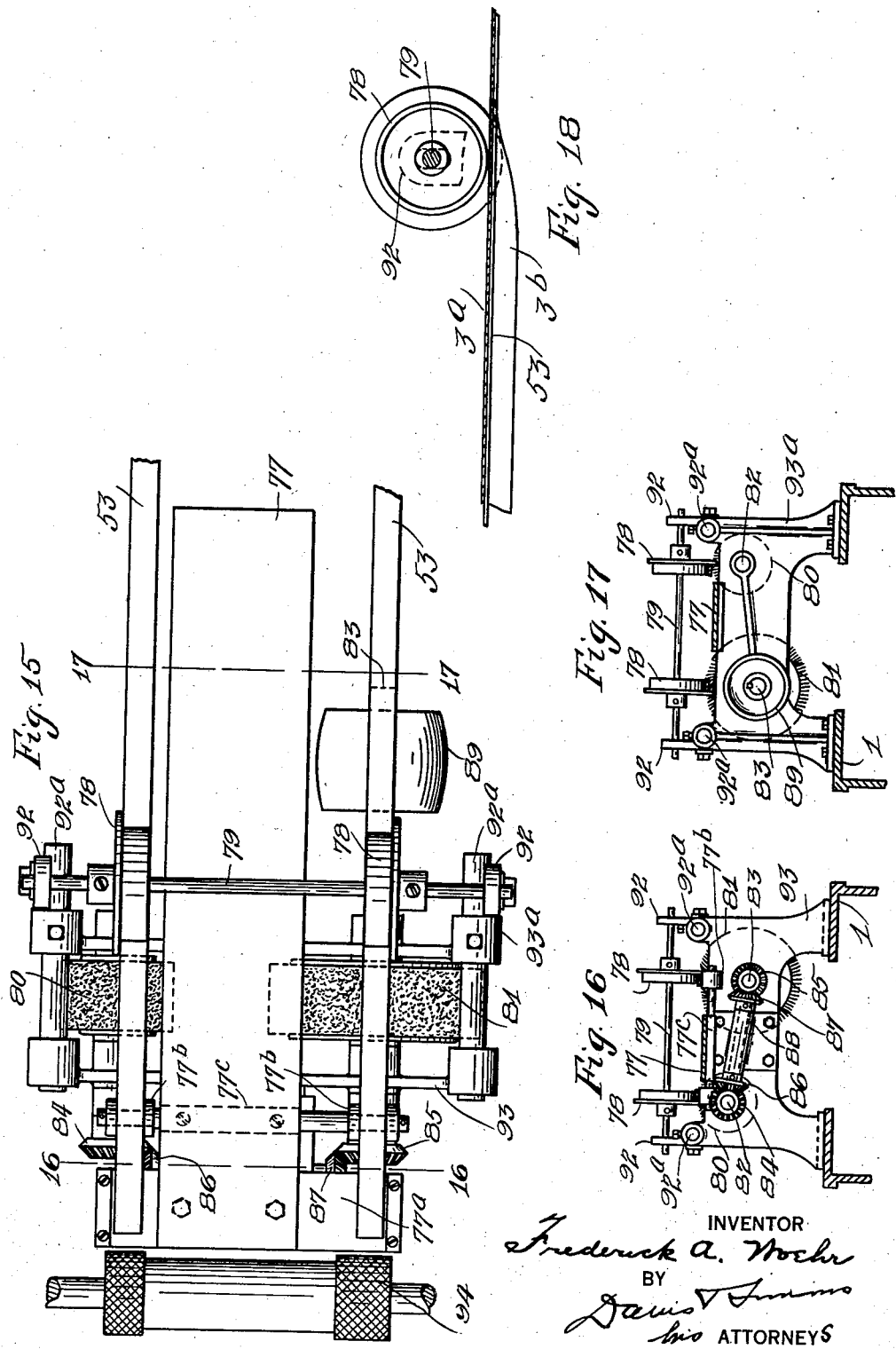

F. A. WOEHR.
STRIP UNITING MACHINE.
APPLICATION FILED FEB. 4, 1921.

1,417,651.

Patented May 30, 1922.
8 SHEETS—SHEET 6.

INVENTOR.
Frederick A. Woehr
BY
Davis & Timms
his ATTORNEYS.

F. A. WOEHR.
STRIP UNITING MACHINE.
APPLICATION FILED FEB. 4, 1921.
1,417,651.
Patented May 30, 1922.
8 SHEETS—SHEET 7.
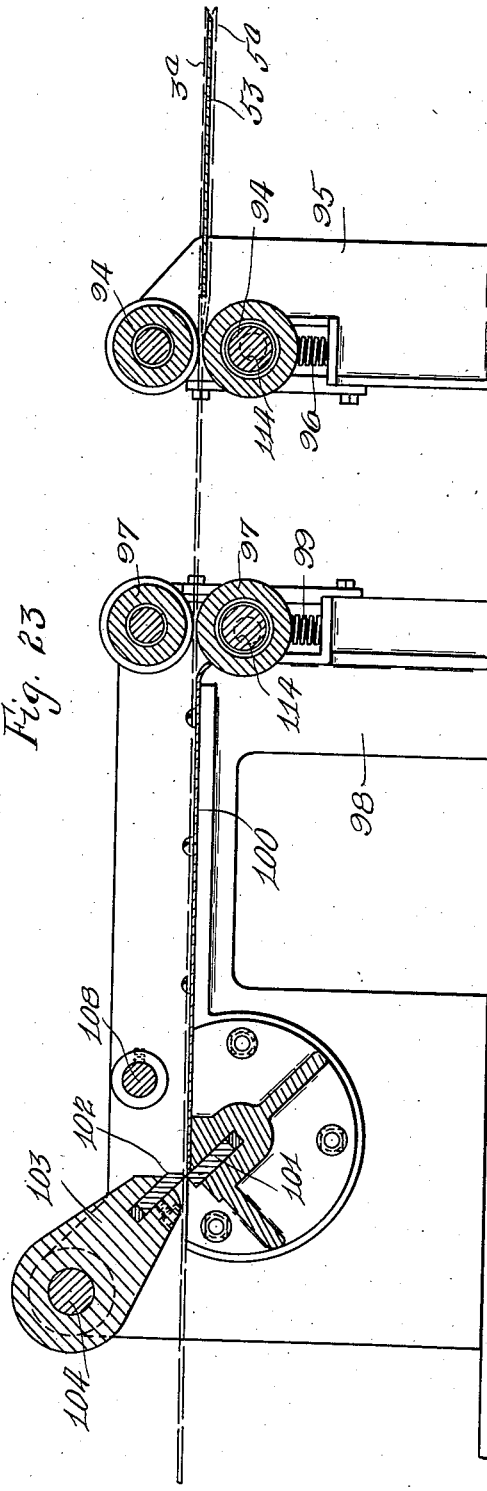
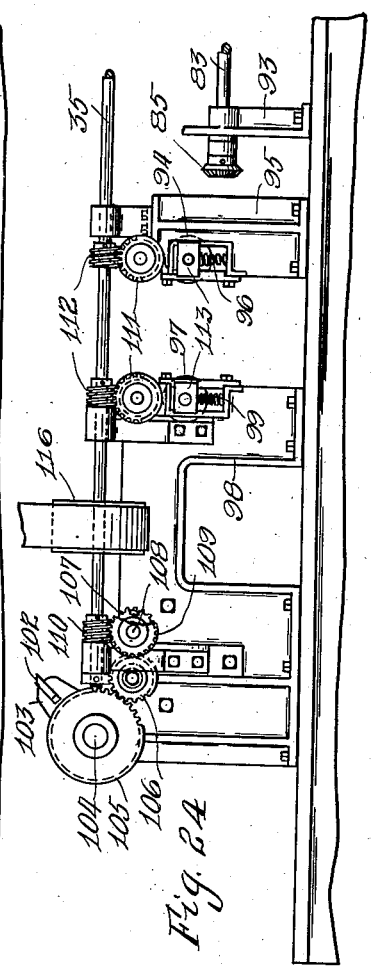
INVENTOR.
Frederick A. Woehr
BY
ATTORNEYS.

F. A. WOEHR.
STRIP UNITING MACHINE.
APPLICATION FILED FEB. 4, 1921.
1,417,651.
Patented May 30, 1922.
8 SHEETS—SHEET 8.
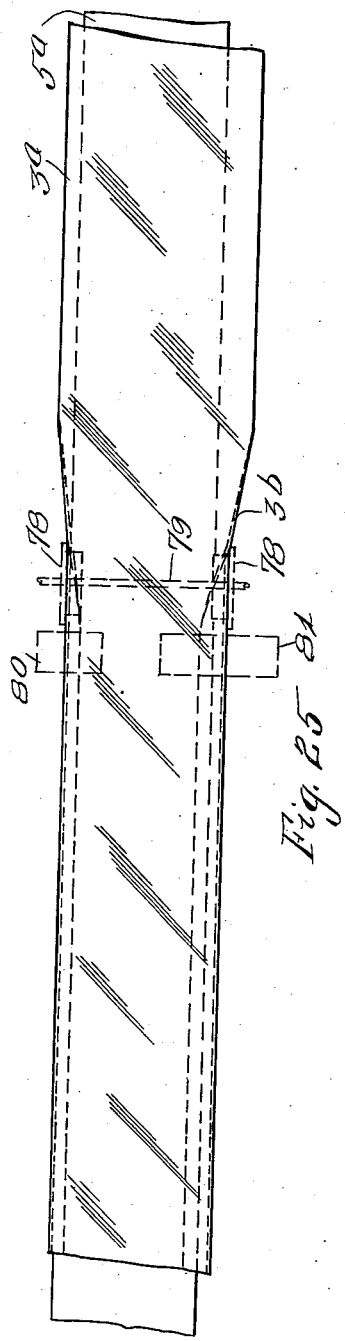
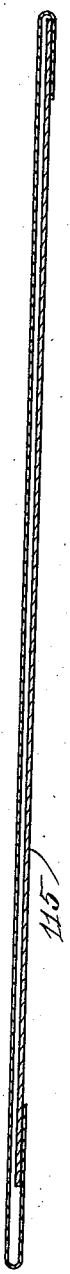
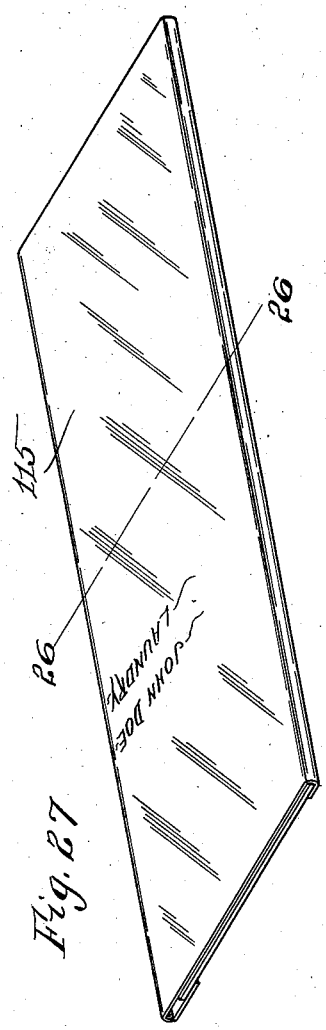
INVENTOR.
Frederick A. Woehr
BY
Davis & Humms
his ATTORNEYS.

UNITED STATES PATENT OFFICE.

FREDERICK A. WOEHR, OF ROCHESTER, NEW YORK, ASSIGNOR TO GEORGE J. GILLIES, OF ROCHESTER, NEW YORK.

STRIP-UNITING MACHINE.

1,417,651.

Specification of Letters Patent.  Patented May 30, 1922.

Application filed February 4, 1921. Serial No. 442,541.

*To all whom it may concern:*

Be it known that I, FREDERICK A. WOEHR, a citizen of the United States, and resident of Rochester, in the county of Monroe and State of New York, have invented certain new and useful Improvements in Strip-Uniting Machines, of which the following is a specification.

The present invention relates to strip uniting machines, the present embodiment being designed for making envelopes or enclosures used in laundries for holding the laundered shirts. An object of this invention is to provide a machine which is simple in operation and will produce in quantities at a small expense, envelopes or enclosures designed for holding laundered shirts.

To this and other ends the invention consists of certain parts and combinations of parts, all of which will be hereinafter described, the novel features being pointed out in the appended claims.

In the drawings:

Fig. 1 is a plan view of the frame of the machine, showing the driving shaft thereon;

Fig. 2 is a diagrammatic view showing the different mechanisms employed in the machine;

Fig. 3 is a side view of the printing mechanism;

Fig. 4 is a view of the receiving end of the printing mechanism;

Fig. 5 is a view of the printing mechanism opposite that shown in Fig. 3;

Fig. 6 is a fragmentary view showing the manner in which the printing mechanism is operated;

Fig. 7 is a section on the line 7—7, Fig. 4;

Fig. 8 is an enlarged fragmentary section through the rollers in advance of the printing mechanism;

Fig. 9 is an enlarged fragmentary view of the pasting mechanism;

Fig. 10 is a section on the line 10—10, Fig. 12, showing the manner in which the pasting mechanism is adjusted and the manner in which the cardboard is guided thereover;

Fig. 11 is a sectional view on the line 11—11, Fig. 9, showing part of the adjusting mechanism of the pasting mechanism;

Fig. 12 is an enlarged plan view of the pasting mechanism and parts adjacent thereto;

Fig. 13 is a transverse sectional detail adjacent the pasting rollers and shows the manner in which the narrow and wide sheets cooperate with the table;

Fig. 14 is a plan view of the table;

Fig. 15 is a plan view of that portion of the machine adjacent the edge turning mechanism for the upper sheet;

Fig. 16 is a section on the line 16—16, Fig. 15;

Fig. 17 is a section on the line 17—17, Fig. 15;

Fig. 18 is a fragmentary view showing the manner in which the edge of the upper sheet is folded or turned downwardly;

Fig. 23 is an enlarged section on the line 23—23, Fig. 22;

Fig. 24 is a fragmentary view showing the cutting and pressing mechanisms in side elevation;

Fig. 25 is a plan view of the two sheets illustrating the manner in which they travel through the machine;

Fig. 26 is an enlarged section on the line 26—26, Fig. 27; and

Fig. 27 is a perspective view of one of the tubes or holders.

Figure 20:
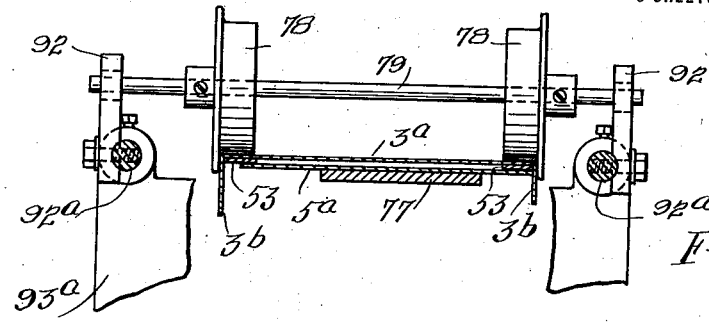
Fig. 20 is a fragmentary section showing the operation of the down-folding or turning devices.

Referring more particularly to the drawings, 1 indicates the frame of the machine which has brackets 2 for supporting a roll 3 of sheet material such as thin paper, and has also brackets 4 for supporting a roll 5 of sheet material such as thin cardboard. The upper sheet 3ª from the roll 3 is directed between two tension rollers 6 and 7, the tension roller 6 being mounted to turn freely on a shaft 8 which is eccentrically mounted at 9 in blocks 10 guided vertically at 11 on a frame 12, springs 13 acting on said blocks to hold the roller 6 yieldingly toward the roller 7. The eccentrically mounted shaft 8 is provided with a handle 14 which in turn moves the roller 6 toward or from the roller 7. The roller 7 is also journalled in the frame and has on its shaft a gear 15 driven in a manner to be hereinafter described. The sheet 3ª after passing between the rollers 6 and 7, passes to a printing mechanism which, in this instance, comprises a lower bed roller 16 and a printing roller 17, both journalled in the frame 12 and geared together by gears 18. The gear 18 of the lower roller meshes with an idle gear 19 which in turn meshes with the gear 15 so that the tension rollers 6 and 7 are driven from the printing mechanism. The printing roller 17 is inked in any suitable manner. In this instance, a hopper or container 20 is provided with a roller 21 at its discharge. This roller is adapted to be engaged by a roller 22 which is supported by arms 23 from a rock shaft 24 and is adapted to carry the ink from the roller 21 to a collecting roller 25. The oscillation of the roller 22 may be effected in any suitable manner. In this instance, the shaft 24 is provided with an arm 26 to which is pivotally connected at 27, a pitman 28, the latter in turn being pivotally connected at 29 to a block 30 which is adjustably secured on a slideway 31 on a shaft 32, said shaft extending transversely of the machine and having a worm wheel 33 at its opposite end meshing with a worm 34 on the drive shaft 35. The drive shaft 35 also has a worm 36 meshing with a worm wheel 37 on a stub shaft 38, said stub shaft carrying a pinion 39 meshing with a pinion 40 on a shaft 41 extending transversely of the machine, parallel with the shaft 32. The shaft 41 carries a guide block 42 in which a pivot pin 43 is adjustably mounted. This pivot pin 43 has a pitman 44 pivotally connected thereto and to an arm 45 at 46, said arm turning on a shaft 47 and having an arm 48 carrying a pawl 49 cooperating with a ratchet wheel 50 on the shaft of the roller 21. The connection between the shaft 35 and the roller 21 is provided for the purpose of intermittently rotating the roller 21 so that a different face of said roller is presented to the roller 22 at each oscillation of the latter. The ink on the collecting roller 25 is distributed by distributing rollers 51, and inking rollers 52 cooperate with the collecting roller 25 and with the printing roller 17 for applying ink to such printing roller. The pinion 40 also meshes with the upper gear 18, such conections effecting rotation from the drive shaft 35 to the printing rollers 16 and 17, while a gear 25ª fixed to the shaft of the collecting roller 25 is driven from the upper gear 18 by an intermediate gear 18ª. The shaft 41 carries a spiral gear 41ª which meshes with a spiral gear 41ᵇ on a shaft 12ª mounted on the frame 12 on the opposite side of the machine from the drive shaft 35, and secured to this shaft 12ª are a plurality of cams 51ª which co-operate with rocking arms 51ᵇ to effect axial movement of the distributing rollers 51.

The sheet 3ª after passing from the printing mechanism, travels over a table formed, in this instance, by two flat strips 53 arranged in parallel relation above the frame 1. These strips are connected by cross strips 54 and have their ends adjacent the printing mechanism supported by brackets 55 and 55ª.

The cardboard strip or sheet 5ª passes below the printing mechanism through a guide box 56 supported beneath the table 53 and thence over a guide roller 57 also supported beneath the table 53 in brackets 57ª. From the guide roller 57, the strip 5ª travels to a pasting mechanism which applies paste to a pasting mechanism which applies paste along opposite edges of the strip 5ª. This pasting mechanism, see Figs. 9 to 12 inclusive, comprises, in this instance, two spaced paste applying rollers 58 arranged on a common shaft 59 and each operating in a separate paste pot 60 which may be moved toward and from the under side of the table 53. Movement of the paste pots is effected, preferably, by securing said pots through bolts 61 to a bed 62 which has inclined ways 63 thereon traveling on inclined ways 64 on a frame 65 which is bolted at 66 to the frame 1. The bed 62 is also provided with a rack 67 and this rack meshes with a pinion 68 on a shaft 69 which is journalled in the frame 65 and has an operating handle or wheel 70. By turning the shaft 69 through the wheel 70, the bed 62 is caused to move on the inclined ways 64 of the frame 65 and in this way carry the paste applying rollers 58 toward and from the cardboard strip or sheet 5ª. The shaft 59 of the pasting rollers is turned preferably through a sprocket 71 which, through a chain 72, connects with a sprocket 73 on a stub shaft 74 which through an idler 75 connects with a gear 76 on the shaft 32 so as to receive motion from said shaft. The gear 75 also meshes with a gear 75ª on the shaft of the guide roller 57 whereby rotation of such roller is effected from the gear 76.

Figure 19:
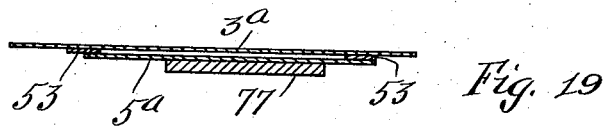
Fig. 19 shows a fragmentary section through the machine, illustrating the position of the sheet just before the down-folding devices operate.

The sheet 3ª and the sheet 5ª travel together at the same speed, one on the upper side of the table 53 and the other on the under side, passing over a second table 77 lying between the side strips of the table 53. The upper sheet 3ª has greater width than the lower sheet 5ª and greater width than the table 53, while the lower sheet has less width than the table 53 as will be seen by referring to Fig. 19, one edge of the lower sheet being directly under one side edge of such table, while the other edge of the lower sheet is arranged in spaced relation to said side edge.

After passing beyond the pasting rollers and onto the table 77, the projecting portions of the upper sheet meet two turning or folding devices in the form of flanged rollers or wheels 78 loosely mounted on a common shaft 79 with their peripheries traveling on the upper sheet above the strips 53 and their flanges operating to one side of said strips so that the sheet 3ª is turned downwardly as at 3ᵇ, Figs. 18 and 20. The shaft 79 is loosely supported in slotted bearings 92 at its opposite ends, this support of the shaft permitting the folding rollers 78 to turn freely under the movement of the sheet 5ª as the latter travels through the machine. The bearings 92 extend upwardly from rods 92ª longitudinally adjustable in bearings formed on a support comprising spaced transverse frame pieces 93 and 93ª. These frame pieces also comprise a support for the table 77 and secured to one end of this table is a cross piece 77ª which supports the outer ends of the table strips 53.

Figure 21:
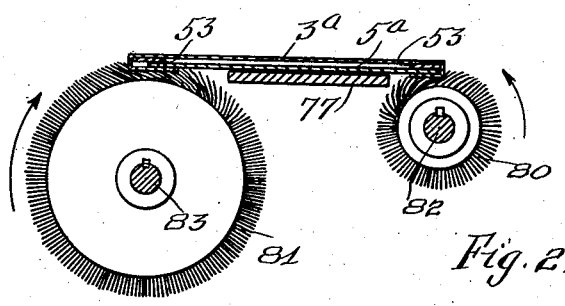
Fig. 21 is a fragmentary sectional view illustrating the manner in which the infolding devices operate.
Figure 22:
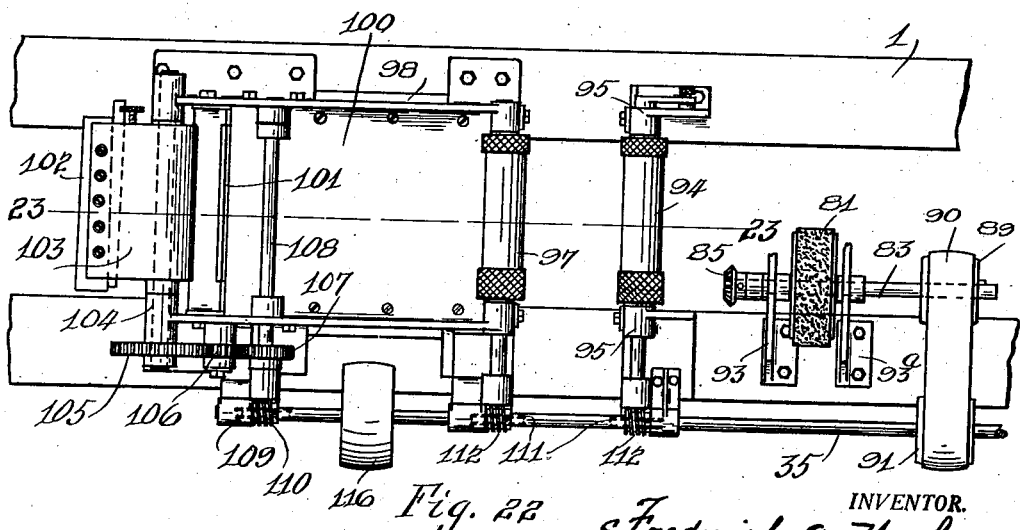
Fig. 22 is a fragmentary plan view of the machine illustrating the pressing and cutting mechanism.

Further on, the downwardly turned edges 3ᵇ meet with other turning or folding devices which, in this instance, are in the form of two rotary brushes 80 and 81 arranged under the table 53 and between the frame members 93 and 93ª, and having their uppermost portions turning inwardly so as to turn the flange portion under the sheet 5ª in contact with the paste along the opposite edges of said sheet, the brushes not only turning the edges 3ᵇ, but also causing them to adhere to the adhesive on the sheet 5ª as will be seen by referring to Fig. 21. The brushes 80 and 81 are mounted respectively on shafts 82 and 83 supported in the frame members 93 and 93ª and provided respectively with bevelled pinions 84 and 85 engaging respectively with bevelled pinions 86 and 87 on a connecting shaft 88. The shaft 83 is preferably driven through a pulley 89 on said shaft, the pulley being turned by a belt 90 which also passes about a pulley 91 on the drive shaft 35.

After the edges 3ᵇ have been adhesively secured to the under sheet 5ª, the two sheets pass over two small rollers 77ᵇ, loosely mounted on the ends of a bar 77ᶜ secured to the under side of the table 77, to a pair of pressing rollers 94 beyond the tables 53 and 77, said rollers being mounted upon frame members 95 supported on the frame 1, the lower roller having its bearings yieldingly supported by springs 96. From the pressing rollers 94, the two sheets pass to pressing rollers 97 arranged in pairs on a frame 98, the lower roller of this pair also having its bearings yieldingly supported as by springs 99. From the second mentioned pressing rollers, which with the first mentioned pressing rollers, compress the adhesively secured parts, the two sheets pass over a table 100 also supported on the frame 98. At the discharge end of this table 100 is arranged a cutting blade or knife 101 supported on the frame 98 and adapted to cooperate with a cutting blade 102 which is arranged on a rotary arm 103 secured to a shaft 104 journalled on the frame 98. With each rotation of the knife blade 102, it cooperates with the knife 101 and severs the joined strips to produce a tube or casing 115, see Fig. 27. The support for the stationary knife 101 is such that it does not interfere with the feeding of the joined strips beyond the knife, that portion projecting beyond the knife being severed to produce the tube or casing. The rotation of the knife 102 may be effected in any suitable manner. In this instance, the shaft 104 is provided with a gear 105 which through an intermediate gear 106 connects with a gear 107 on a shaft 108, the latter having also a worm wheel 109 thereon, meshing with a worm 110 on the main drive shaft 35.

The upper pressing rollers 94 and 97 are driven in any suitable manner. In this instance, each of said upper rollers is provided with a worm wheel 111 which meshes with a worm 112 on the shaft 35. The lower rollers 94 and 97 are not driven except through cooperation with the upper rollers. In order that the pressure of the lower rollers may be varied, blocks 113 in which said lower rollers are mounted have eccentric shafts 114 on which the lower rollers 94 and 97 turn, said shafts being adjustable in any suitable manner as by crank handles to position the lower rollers 94 and 97 in proper cooperation with their respective upper rollers. The drive shaft is driven from a line shaft by a belt engaging over the pulley 116.

The operation of the invention is as follows:

Two rolls of sheet material, such as thin paper 3 and thin cardboard 5 are introduced in the machine and caused to engage the feeding and guide rollers 6 and 7 as well as the printing rollers 16 and 17. The two sheets travel together, the upper thin sheet being printed as it passes the printing mechanism. When the pasting mechanism is reached, the under sheet is provided with an adhesive along opposite edges and the sheets moving on, reach the flanged rollers 78 which turn downwardly the projecting edges of the upper sheet. These downwardly turned portions are later turned inwardly in engagement with the adhesive by the brushes 80 and 81, thus completing the tube. It will be noted that one edge of the lower sheet at the brushes 80 and 81 is located at a greater distance from the adjacent downwardly turned portion of the upper sheet than is the other edge of said lower sheet, with reference to its adjacent downwardly turned portion. This arrangement permits the upper sheet to be bulged with reference to the lower sheet in order that the shirt may be introduced between the two sheets. After the tube passes the brushes, it passes through the pressing rollers 94 and 97 which effectively unite the two two sheets. Beyond the pressing rollers, the tube is severed into sections by the cutting mechanism, embodying the two knives 101 and 102, the knife 102 after effecting the cutting movement, moving in such a manner as to prevent interference with the portion of the tube which is next to be cut off.

From the foregoing it will be seen that there has been provided a machine which will unite two strips of sheet material along both edges. These sheets, in this instance, have different weights, one being heavier than the other. The lighter weight sheet is wider than the heavier sheet and has its edges turned about the edges of the heavier sheet and adhesively secured to such heavier sheet in such a manner that the lighter sheet may be bulged with reference to the heavier sheet. A printing mechanism may be combined with the uniting mechanism to print upon one of the sheets. The pasting mechanism is of novel construction and may be readily brought into or out of action. A novel folding mechanism is provided which turns down the opposite edges of the thinner sheet and thereafter turns said edges inwardly into engagement with an adhesive along opposite edges of the heavier sheet. The united edges are subjected to a compression for firmly uniting such edges. The tube is then severed into sections to provide a number of short tubes or enclosures without any stopping of the tube forming means. It will be apparent that the invention is not limited to uniting both edges of the two sheets, nor to the making of tubes of the class described, as certain features of the invention may be used in other machines where similar results are desired.

What I claim as my invention and desire to secure by Letters Patent is:

1. A machine of the class described comprising means for feeding two separate strips of material in parallel relation, means for supplying an adhesive to the strips for uniting the edges of the two strips, and mechanism for folding the opposite edges of one of the strips about the edges of and in engagement with the outer face of the other strip during the feeding of the strip.

2. In combination with a table, of means for feeding two strips of sheet material on opposite sides of the table, one of said strips movable with its edges projected beyond opposite edges of the table and the other of said strips having one edge movable in line with an edge of the table and the other edge spaced inwardly from the opposite edge of the table, a mechanism for turning the projecting edges of the first claimed strip about the edges of the table and into engagement with the outermost face of the strip on the other side of the table.

3. A machine of the class described comprising means for feeding two strips of sheet material, one of which is wider than the other, means for applying an adhesive to the outer face along opposite edges of the narrower strip, a table on opposite sides of which the two strips pass, means for turning the edges of the wider strip laterally on opposite sides of the table, and means for turning the laterally turned edges inwardly into engagement with the adhesive.

4. A machine of the class described comprising a table, means for feeding two strips of sheet material on opposite sides of the table, one of said sheets being wider than the other and projecting beyond the opposite edges of the table, means cooperating with said table to turn the projecting edges of the wider sheet laterally, and means cooperating with the table to turn the laterally turned edges of the wider sheet inwardly into engagement with the opposite edges of the narrower sheet.

5. A machine of the class described comprising a table, means for feeding two strips of sheet material, one above and the other below the table, the strip above the table being wider than the strip under the table and projecting from opposite side edges of the table, flanged rollers for cooperating with the table to turn the projecting edges of the wider sheet downwardly, and means cooperating with said downwardly turned edges of the wider sheet for turning them inwardly into engagement with the narrower sheet.

6. A machine of the class described comprising a table, means for feeding two strips of said material, one above the other below the table, the strip above the table being wider than the strip below the table and having its opposite side edges projecting beyond the opposite side edges of the table, means cooperating with said projecting edges for turning said edges downwardly, and brushes cooperating with the downwardly turned portion of the upper sheet to turn the edges inwardly into engagement with the under sheet.

7. The combination with means for feeding two strips of paper in parallel relation with the edge of one of said strips projecting beyond the edge of the other, of a folding mechanism for turning said edge laterally along the edge of the other sheet and inwardly in engagement with the outermost face of the strip during the feeding of the strip.

8. The combination with a table, of means for feeding two strips of sheet material, one above and one below the table with the edge of one of said strips projecting beyond one edge of the table, and mechanism for turning said projecting edge about the edge of the table and into engagement with the strip of material on the other side of the table.

9. The combination with a table, of means for feeding two strips of material, one above the other below the table, with the edge of one of said strips projecting beyond the edge of the table, a flanged roller cooperating with said table to turn the projecting edge laterally about the edge of the table, and means for cooperating with said turned edge for turning it inwardly into engagement with the other sheet.

10. A means for uniting the edges of two strips of sheet material comprising a table, means for feeding two strips of said material on opposite sides of the table with the edge of one strip projecting beyond the edge of the table, and mechanism for folding the projecting edge about the edge of the table and into overlapping relation with the other strip.

11. Means for uniting the edges of two strips of sheet material comprising a table, means for feeding the two strips on opposite sides of the table with the edge of one of the strips projecting beyond the edge of the table, means for applying an adhesive along an edge of one of the strips, and mechanism for turning the projecting edge into overlapping relation with the edge of the other strip.

12. A machine of the class described comprising a table, means for feeding two strips on opposite sides of the table, one of said strips being wider than the other and projecting beyond opposite side edges of the table, means for applying an adhesive along opposite edges of the other strip, and mechanism for turning the projecting edges around the edges of the table and into engagement with the adhesive on the other strip.

13. A machine of the class described comprising a table, means for feeding two strips on opposite sides of the table, one of said strips being wider than the other and projecting beyond opposite side edges of the table, means for applying an adhesive along opposite edges of the other strip, and mechanism for turning the projecting edges around the edges of the table and into engagement with the adhesive on the other strip, said mechanism comprising two flanged rollers cooperating with opposite edges of the table to turn the projecting edges laterally, and two brushes for cooperating with opposite edges of the table to turn the laterally turned portions inwardly.

14. A machine of the class described comprising means for feeding two strips of paper in parallel relation, one of said strips being wider than the other and projecting beyond opposite edges of the narrower strip, means for applying an adhesive along opposite edges of the narrower strip, means for turning the projecting edges of the wider strip around the edges of the narrower strip and into engagement with said adhesive, means for compressing the adhesively secured edges, and means for severing the thus formed tube into sections.

15. A machine of the class described comprising means for feeding two strips of paper in parallel relation, one of said strips being wider than the other and projecting beyond opposite edges of the narrower strip, means for applying an adhesive along opposite edges of the narrower strip, means for turning the projecting edges of the wider strip around the edges of the narrower strip and into engagement with said adhesive, means for compressing the adhesively secured edges, and means for severing the tube into sections, said severing means comprising a stationary knife over which the tube is caused to travel, and a rotary knife cooperating with said stationary knife.

16. A machine of the class described comprising means for feeding two strips of sheet material in parallel relation, one above the other, the uppermost strip being wider and projecting beyond opposite edges of the narrower strip, two spaced pasting rollers for cooperating with the under strip, means for feeding said rollers toward and from the under strip, and means for turning the edges of the upper strip about the edges of the lower strip and into engagement with the adhesive on the lower strip.

17. A machine of the class described comprising means for feeding two strips of sheet material in parallel relation, one above the other, the uppermost strip being wider and projecting beyond opposite edges of the narrower strip, two spaced pasting rollers for cooperating with the under strip, a bed supporting said rollers having inclined ways thereon, a frame having inclined ways for cooperating with the inclined ways of the bed, means for moving said bed on the inclined ways of the frame, and means for turning the edges of the upper strip about the edges of the lower strip and into engagement with the adhesive on the lower strip.

18. A machine of the class described comprising means for feeding two strips of sheet material, one above the other, the upper sheet being wider than the first named sheet and projecting beyond opposite edges of the first named sheet, a table on opposite sides of which the two sheets are fed, two flanged rollers cooperating with the opposite edges of the table to turn the projecting edges of the upper sheet downwardly, and a loosely mounted shaft by which the flanged rollers are carried.

FRED. A. WOEHR.